Feb. 15, 1938. E. L. THEARLE 2,108,624
DYNAMICALLY BALANCING ROTATABLE BODY
Filed April 28, 1936 2 Sheets-Sheet 2
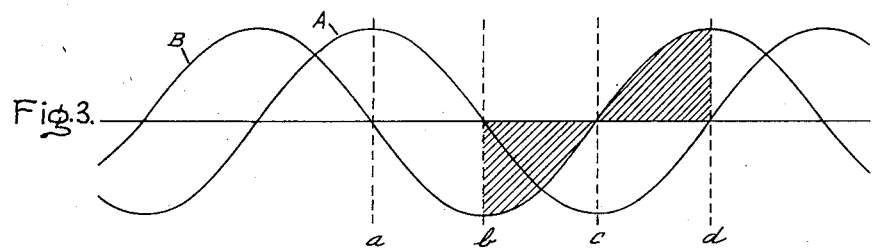
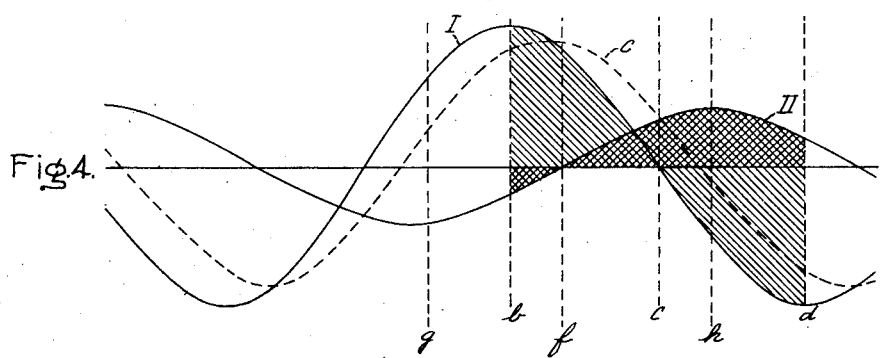
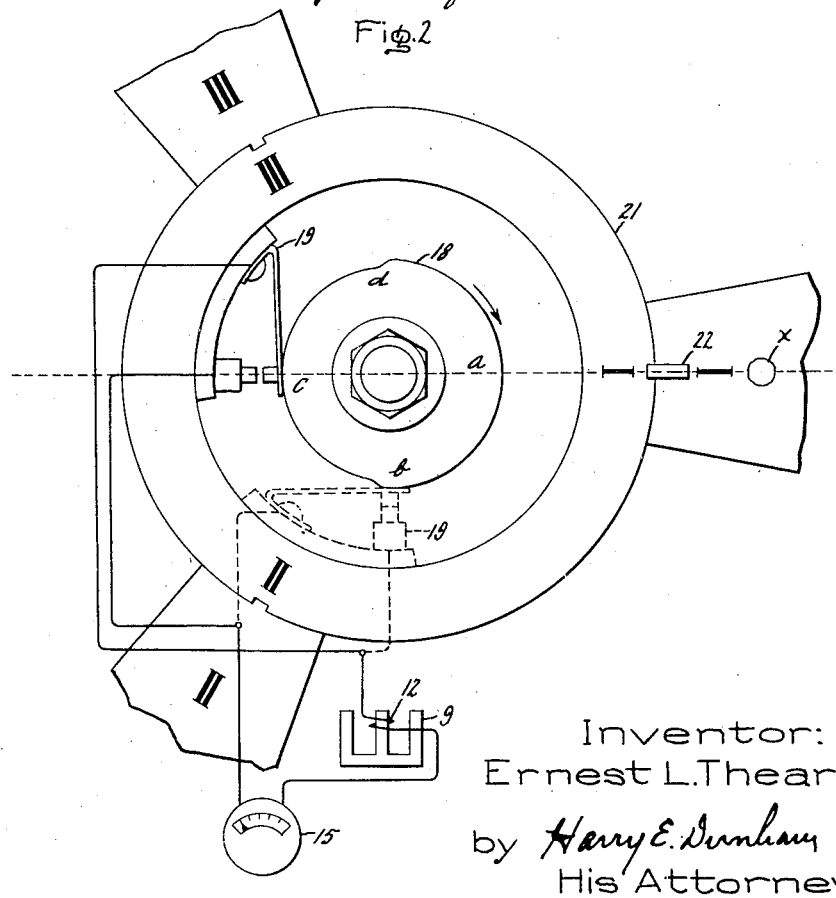
Inventor:
Ernest L. Thearle,
by Harry E. Dunham
His Attorney.

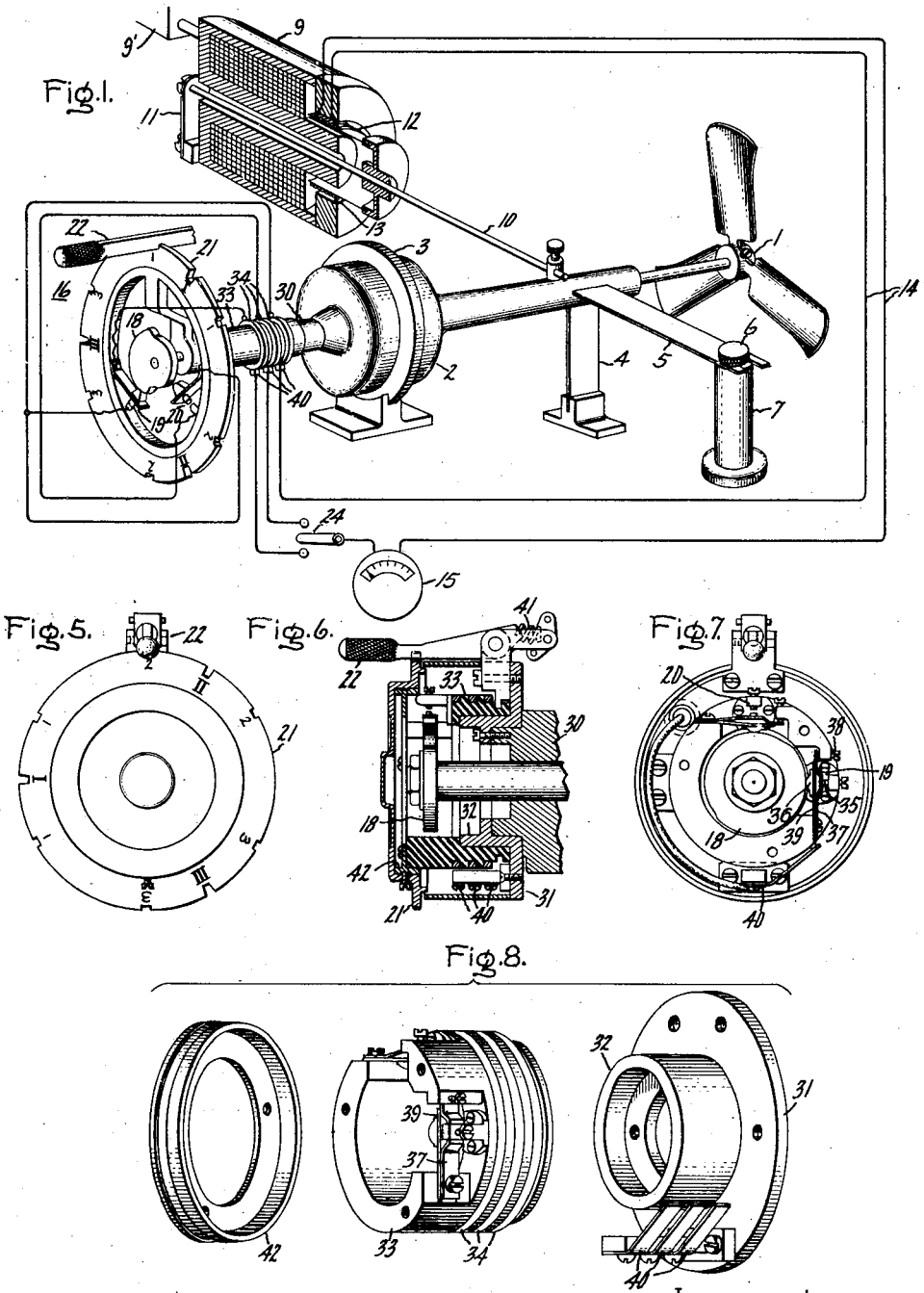

Patented Feb. 15, 1938

2,108,624

UNITED STATES PATENT OFFICE 2,108,624

DYNAMICALLY BALANCING ROTATABLE BODY

Ernest L. Thearle, Schenectady, N. Y., assignor to General Electric Company, a corporation of New York Application April 28, 1936, Serial No. 76,794

11 Claims. (Cl. 73—51)

My invention relates to the dynamic balancing of rotating bodies and more particularly to an improved method and means for analyzing the unbalance of fans and similar devices into components respectively associated with a plurality of circumferentially spaced balancing centers at which it is necessary or desirable to apply balancing weights.

In balancing a rotating body whose axial length is small in comparison with its diameter, the usual procedure is to determine and apply a single corrective weight at a proper point on the body. In many cases, however, as for example, in that of a multi-bladed fan, the balancing operator finds that the weight should be applied at some theoretical point between two blades. He is then confronted with the problem of distributing the weight properly between the two blades adjacent to this point. This step normally involves an additional complicated operation which consumes considerable time and introduces further possibility of error on the part of the operator.

It is an object of the present invention to provide an improved fan balancing apparatus and method of applying the same which by a simple operation will locate the two blades requiring corrective weights and by a further easily practiced operation, will ascertain the amount of correction needed for each blade. In a preferred embodiment of the invention this is accomplished by generating an observable quantity, such as an electromotive force, whose characteristics are determined by the total unbalance of the fan and selectively eliminating from such quantity all components except those which are attributable to the unbalance forces associated with a single one of the fan blades.

It is a further object of the invention to provide in apparatus applicable to this use a novel indicating mechanism for expediting as far as possible the analysis of the total unbalance into its component parts.

The novel features which I believe to be characteristic of my invention are set forth with particularity in the appended claims. My invention itself, however, both as to its organization and the method of application, together with other objects and advantages thereof, will best be understood by reference to the following specification taken in connection with the accompanying drawings in which Fig. 1 illustrates diagrammatically an apparatus suitable for the practice of my invention; Fig. 2 represents the superposed projections of certain parts of such apparatus selected for explanatory purposes; Figs. 3 and 4 show graphically certain relationships useful in the explantion of the invention; Figs. 5, 6 and 7 are different views in section and in detail illustrating a particular embodiment of the invention, and Fig. 8 is an exploded perspective view of this embodiment.

Referring to Fig. 1, I have shown a fan 1, assumed to be in unbalanced condition, mounted on the shaft of a driving motor 2. This motor, which may be powered in any desired fashion, should be of such character as to be capable of being driven at a constant determinable speed in order to assure consistent operating conditions. The motor is supported centrally by a ring 3 of flexible material, for example, rubber, while further support is afforded to the portion of the motor bearing housing extending toward the fan 1 by a vertical leaf-spring 4. The supporting element 3 and the spring 4 should have sufficient elasticity so that vibrational forces caused by the unbalance of the fan 1 will be effective to cause considerable oscillation of the motor in a horizontal plane. A horizontal strut 5, which is adapted to be rigidly clamped at its outer end by a thumb screw 6 cooperating with a stationary block 7, is provided for the purpose of preventing excessive oscillation of the motor structure while being brought up to speed and, particularly, while passing through a range of resonance.

In order to detect vibrations produced by the fan unbalance, I provide an electromagnetic generator consisting in part of a stator member 9 rigidly secured to some body 9' whose position is fixed with respect to the motor 2. Running longitudinally through the stator is provided a relatively movable shaft 10 aligned with the stator by means of a flexible link 11. This latter element should have enough flexibility to permit considerable independent vibratory motion of the rod 10 without requiring a corresponding motion of the stator member 9.

The body of the stator member is constituted of magnetic material and is so formed as to provide near one end thereof an annular air gap 13. An armature coil 12, supported in this gap by attachment to the shaft 10, effectively cooperates with the magnet field to detect any relative motion of the shaft and the magnet structure. Thus, any oscillations of the motor 2 attributable to unbalanced masses in the fan being tested will generate in the coil 12 an electromotive force and current having characteristics determined by the nature of the unbalance. More specifically stated, the electromotive force will have an amplitude which is proportional to the amount of the unbalance and a phase angle which is dependent on its location.

Since the form of the electromagnetic generator does not in itself constitute an aspect of my present invention, I consider it unnecessary to discuss its construction in greater detail. I have, however, described and claimed a generator embodying features particularly adapted for this use in my co-pending application, Serial No. 76,795, filed April 28, 1936, and assigned to the same assignee as the present invention.

In order that the electrical currents produced in the coil 12 may be translated or analyzed in such a manner as to give a direct indication of the magnitude and location of the unbalance in the fan 1, an external circuit is provided including current conductors 14, a direct current galvanometer or ammeter 15 and an intermittently operated circuit-interrupting mechanism indicated as a whole by the numeral 16. For the present it is sufficient to state that with the circuit connections shown the reading of the meter 15 will represent the integrated value of the positive and negative pulses of current originating in the coil 12 during such time as the circuit-controlling mechanism 16 is operative to maintain a closed circuit therethrough. In order to make clear the manner in which this "integrating" effect may be utilized to determine the amount and location of the unbalance in the fan, it is necessary to discuss in some detail the nature and consequences of an unbalance existing in a rotating body.

Referring to Fig. 2, I have shown diagrammatically the superposed projections of a three-bladed fan and a rotatable mounting ring 21 bearing a contactor 19 adapted to be operated by a cam 18 fixed to the fan driving shaft. For convenient reference the fan blades are designated by the Roman numerals I, II and III respectively.

If it be considered that the fan blade I is in some way out of balance with respect to the other blades, either by virtue of an excess or deficiency of weight in the region X, then the rotation of the blade will cause a recurrent displacement of the fan shaft in any direction, say the horizontal, which will vary from a positive maximum to a negative maximum for each complete revolution. In general, this variation will be sinusoidal and may be represented by a curve such as curve A of Fig. 3. The velocity of vibration of the shaft will lead the displacement by 90°, being maximal at the time the shaft passes through its central position and zero when the shaft displacement is greatest. This variation is shown in curve B and is significant in that the electromotive force developed by the generator coil 12 of Fig. 1 follows substantially the same curve.

Assuming for the sake of simplicity that the shaft displacement is in phase with or exactly follows the position of the unbalanced blade (assumed to be blade I) such displacement will be a maximum and the horizontal velocity of vibration will be zero, when blade I reaches the position indicated as $a$ in Fig. 2 and again when position $c$ is reached. These positions are indicated on the sinusoidal curves of Fig. 3 by the similar index figures $a$ and $c$ each referred to a vertical datum line.

Since it is well known that the velocity of vibration is proportional to the unbalance force causing such vibration, it is clear that if the amplitude of curve B can be measured, then an indication of the amount of unbalance will be available. Suitable apparatus for making such a measurement is provided in the present instance by the combination of the electromagnetic generator coil 12, the direct current meter 15 and the intermittent circuit-interrupter 16. It will be noted that this latter device includes a contactor 19 and an actuating cam 18 having a raised portion subtending 180 angular degrees.

If the mounting ring 21 is rotated circumferentially to bring the contactor to a position, such as that shown in dotted outline in Fig. 2, where it will be closed from the time the fan blade I passes through the position $a$ until it passes through the position $c$, then the meter 15 will be subjected to a pulse of current corresponding to the total area falling under the curve B between the points $a$ and $c$. Under these conditions the meter deflection, properly calibrated, will afford a direct indication of the vibrational velocity of the motor shaft and, consequently, of the amount of unbalance of the fan blade I.

The foregoing discussion is concerned chiefly with the determination of the magnitude of an unbalance force whose location is assumed to be already known. The apparatus above described is, however, equally adapted to the determination of an unbalance location. This may be illustrated by again assuming that the unbalance is entirely on the blade I, but that this fact is still undetermined by the operator. It will be found that if the contactor 19 is rotated experimentally, two positions may be determined at which the meter 15 registers a zero reading. As an arbitrary convention and in order to avoid confusion, it is proposed to select only the one of these points at which rotation of the contactor in either direction produces a deflection of the meter needle in the same direction. By reference to Figs. 2 and 3 it will be evident that under the conditions predicated such a zero point will occur when the contactor has been rotated to the full line position $c$ so that its circuit is closed from the time the blade I reaches the point $b$ until it passes point $d$. Under these circumstances the current impressed on the meter will consist of a negative pulse $bc$ immediately followed by an equal and opposite positive pulse $cd$ and will produce no resultant motion of the meter needle. These pulses correspond to the shaded areas shown in Fig. 3. Continued clockwise rotation of the contactor will produce a positive reading on the meter, while a counterclockwise rotation will tend to produce a negative reading.

With a fixed orientation of the raised portion of the cam 18 with respect to the blade I such as that shown, the fact that the meter reads zero only when the contactor is at the position $c$ will be an indication that the unbalancing forces are concentrated entirely in the blade I. If, however, with the cam 18 still mounted on the shaft in the same position, it happens that the unbalance is located at some other point, say entirely on blade II, then the position of the contactor required to give a zero reading will also be determinative of this fact.

It is of course unnecessary to observe and interpret the actual position of the contactor 19, it being more convenient to determine this indirectly by noting the angular displacement of the rotatable mounting ring 21 attached thereto. This may be marked with appropriately positioned numerals corresponding to those of the fan blades, which when referred to a stationary index pointer 22 will give an immediate reading of the location of the unbalance. It will be understood, for example, that if a zero reading of the meter 15 occurs when the numeral I on the mounting ring falls under the pointer, the contactor must be in position c, as illustrated, and the unbalance must be confined to blade I.

The above statements are literally true only when the original assumption that the shaft displacement is in phase with the position of the unbalanced force, is fulfilled. In actual practice this condition is rarely met and a lag of at least 175 degrees is commonly observed. However, this lag will be substantially constant for a given size of fan and a fixed driving speed and may be taken into account in interpreting the position of the contactor 19. A convenient mode of making such an allowance consists in providing an initial compensatory displacement between the actual position of the contactor on the marked mounting ring 21 and the position which it ought to assume if the ideal condition of no lag were fulfilled. Once the proper adjustment is made, no further consideration need be given to this factor.

I have so far described the use of my apparatus in locating an unbalance assumed to be confined entirely to some one fan blade. It should be understood, however, that its utility is not limited to such a condition, and that it may be employed with equal facility in locating an unbalance which is distributed between two blades. In this case the position of the contactor 19 required to produce a zero reading of the meter will be such as to cause the pointer 22 to fall between some two numerals indicating a particular pair of blades. Such a result is in fact the one most frequently encountered in actual practice and raises the problem of correcting for an unbalance effect apparently existing at a point not associated with any of the solid parts of the fan. The practical solution is to add separate corrective weights to the two blades adjacent the apparent location of the unbalance, and the present invention is chiefly concerned with the question of determining quickly and easily the proper apportionment of these weights.

In Fig. 4, I have illustrated a series of curves illustrating the nature of the vibrations attributable to unbalance forces existing on each of the two individual blades and also their resultant unbalance effect. Under the conditions assumed this resultant will correspond to the dotted curve C which represents the variations of the vibrational velocity of the motor shaft as measured along a horizontal axis. The zero points of this curve may be determined by rotation of the contactor 19 to the position required to give a zero reading of the meter 15. As previously explained, the then observed relation between the pointer 22 and the dial 21, will serve to locate the apparent total unbalance of the fan. For purposes of further explanation it will be assumed that in the case being considered the pointer falls between the numerals I and II on the dial, thus indicating that the total unbalance is distributed between the two blades bearing the corresponding numbers.

It is known that any sinusoidal curve may be broken up into an infinite number of pairs of angularly displaced sinusoidal curves which will combine to produce the original curve. For the purposes of the present invention it is desirable to regard the curve C as being analyzed into two complementary curves I and II displaced from one another by 120°. The zero points of the curves I and II are to be so chosen that the curve I may represent the variations in shaft vibration produced by unbalance forces actually centered in the blade I, while the curve II represents similarly the unbalance effect of forces centered in the blade II. The relative amplitudes of the curves I and II will depend upon the proportion of the unbalance which is properly attributable to each of the respective fan blades. Consequently, if these amplitudes can be separately measured, their values will be a direct indication of the sizes of the separate balancing weights required to be applied to each blade.

An important aspect of my present invention consists in the provision of apparatus for mechanically separating and evaluating the various components of unbalance. Briefly stated, this apparatus comprises means for so determining the limits of integration of the voltage generated in the coil 12 that the effect thereon of unbalance forces associated with any particular fan blade may be selectively eliminated.

Let it first be assumed that the total unbalance of the fan has been located as a deficiency of weight existing between blades I and II as suggested above. If now the dial 21 is turned until the pointer 22 registers with the slot I, provided for that purpose, the relative position of the contactor elements will be as shown in full outline in Fig. 2.

I have previously explained that under these conditions the contacts 19 will be closed from the time blade I passes through b until it later passes through d. Accordingly there will be no deflection of the meter 15 which can be attributed to the unbalance forces centered in the blade I. This is in view of the fact that the integrated value of the voltage generated by the unbalance effect of the blade I consists of equal positive and negative impulses corresponding to the shaded area falling solely under the curve I of Fig. 4.

Nevertheless a certain deflection of the meter will still be observed due to the fact that during the period of closure of the contacts 19 the unbalance forces centered in the blade II are also effective to cause some vibration of the motor shaft. Actually the magnitude of this reflection will be determined by the integrated area of the curve II in the region bd, the area in question being indicated in Fig. 4 by double cross-hatching.

Slight reflection will show that since the curve II is exactly 120 degrees displaced from curve I (corresponding to the displacement of the fan blades) the index line b, which passes through the maximal point of curve I, must necessarily pass through curve II at a point 30 degrees from its zero point. Similarly the index line d passes through a point 150° advanced with respect to the same zero point. This relationship must hold, no matter what the respective magnitudes of curves I and II may be, so that the integration of the significant positive and negative areas under curve II (i. e., the doubly cross-hatched region) will always bear a definite and mathematically determinable relation to the area of a full half wave of the same curve. Accordingly, if the meter 15 is so calibrated that the deflection attributable to such a full half wave is a direct indication of the amount of unbalance of the particular blade, then the meter reading under the conditions assumed above can be corrected to give the same result by simply multiplying by a constant proportionality factor. Actually, for the present application, it will prove more expedient to modify or calibrate the meter scale so that it gives a correct reading only under the conditions last assumed without any computative steps whatever.

The corrective weight to be added to the blade II having been determined as explained in the foregoing, the weight required for blade I may be ascertained in an exactly similar fashion. Thus, for this purpose, the dial should be rotated until the center of integration falls upon the zero point of curve II, which also results in a positive meter reading.

By reference to Fig. 4 it will be seen that this may be accomplished by a 60 degree clockwise rotation of the mounting 21 to place the center of integration at the line f. Under this condition the reading of meter 15 will comprise the integrated value of the electromotive force generated in the period gh. By analogy with the reasoning of the preceding paragraphs, it should be clear that this reading will be exclusively indicative of the component of unbalance due to forces centered in blade I.

After these observations are completed the motor 2 may be stopped and corrective weights added to the fan blades I and II in exact accordance with the meter readings. The consequent avoidance of further analysis or computation on the part of the operator is plainly of the greatest importance in speeding up production testing and in decreasing errors.

Having set forth generally the principles of my invention, I shall now describe a specific apparatus by means of which even an unskilled operator may practice the same with little or no chance of error. Referring again to Fig. 1, it will be seen that the circuit interrupter 16 comprises, in addition to the contactor 19, a second contactor 20 displaced 90 degrees from the first contactor in a counterclockwise direction. Furthermore, in addition to the principal pattern of Roman numerals appearing on the dial 21 and to which reference has been confined in the preceding discussion, a subordinate pattern is provided comprising duplicate sets of Arabic numerals. Each of the latter index numbers is provided with an associated slot adapted to register with the pointer 22, and the arrangement of the numbers is such that each Arabic numeral is displaced from its corresponding Roman numeral by 30 angular degrees in either the clockwise or the counterclockwise direction.

In the actual determination of corrective weights the initial meter reading is taken with the switch 24 in the lower position so that the contactor 19 is in control of the meter circuit. This is the condition assumed in the preceding explanatory discussion and permits the unbalance to be located between a particular pair of blades by observing the correlation of the pointer 22 and the Roman index numerals when the meter 15 reads zero.

If it be considered that by use of the contactor 19 the unbalance has been determined to be between blades I and II, it is desired in order to minimize errors to enable the operator to make the further observations required by utilizing only the dial index numbers lying between the Roman numerals I and II. I shall now proceed to show that this result may be accomplished simply by throwing the switch 24 to its upper position in order to place the contactor 20 in circuit with the meter 15.

The immediate effect of such a change is to transfer the center of integration of the voltage generated by the coil 12 to a point 90 degrees in advance of its former center. It will be recalled that in order to obtain a meter reading exclusively indicative of the unbalance forces centered in blade II it was previously stated to be necessary to bring the pointer 22 into coincidence with the slot I. Under the new conditions assumed, therefore, in order to provide closed contacts during an identical period and to obtain the same reading it will be necessary to have the slot I, 90 degrees displaced from the pointer 22 in a clockwise direction. It will be clear that such displacement will result in the pointer 22 being alined with the slot 2 which is between slots I and II. Accordingly, it may be given to the operator as a definite rule that to determine the unbalance of blade II, it is only necessary to make the dial setting just indicated and to observe the meter reading.

This reading taken, the dial 21 may then be rotated 60 degrees in the clockwise direction to obtain a corresponding reading for blade I as previously explained. The operator in charge, however, need only be instructed to set the pointer 22 in the slot 1 which lies between slots I and II since this step will automatically produce the required contactor orientation.

It may readily be demonstrated that a similar procedure can be followed in cases where the unbalance location falls between blades II and III, or between blades III and I. Summarily stated, the operator's entire routine thus consists in using the principle number pattern in conjunction with contactor 19 to locate the unbalance between two blades and thereafter using the subordinate number pattern in conjunction with contactor 20 to determine the apportionment of corrective weights. This latter pattern actually defines positions of the contactor which are effective to eliminate from the meter reading all effects attributable to unbalance forces associated with a particular fan blade.

In Figs. 5 to 8, I have illustrated the details of a particular circuit-interrupting apparatus suitable for use in connection with my invention. In these figures parts corresponding to those illustrated in Fig. 1 have been similarly numbered.

The circuit interrupter as a whole is shown in Fig. 6 as being mounted on a rigid base 30 comprising an extension of the motor shaft housing. This base supports a metal ring 31 provided with a central aperture having an upstanding flange 32 surrounding the aperture. The outer periphery of this flange acts as a bearing surface for a rotatable insulating member 33 which is of generally cylindrical form and which in its turn serves as a carrier for a pair of contactors 19 and 20 corresponding to those previously described in explaining the operation of the invention.

As shown in greater detail in Fig. 7, each of the contactors comprises a stationary portion and a movable portion. Referring particularly to the contactor 19, it will be seen that the movable portion which is adapted to be actuated by the cam 18, includes, in the particular form illustrated, a flexible beam comprising a bent leafspring 37 rigidly fixed at one end and abutting at the other against an adjustable set screw 38 by which the pressure of the spring can be varied. A cam follower 36 is attached to a second leafspring 39 which is mounted in cantilever fashion so as to be in contact with an intermediate portion of the contact bearing spring 37. As a consequence of this association of parts the contactor is positively closed once during every revolution of the cam 18, the closure period continuing during 180 degrees of revolution of the cam.

Also mounted on the movable member 33, I provide three slip-rings 34 which are connected with the respective stationary and movable contacts of the circuit interrupting mechanism. (These connections are not shown in Figs. 5 to 8 but correspond to those indicated schematically in Fig. 1.) Cooperating with the slip-rings 34, I further provide stationary brushes 40 fixedly mounted on the ring 31. These brushes are connected with external conductors as shown in Fig. 1 leading to the switch 24 and the coil 12 respectively. The principal function of the brush and slip-ring combination is to permit free rotation of the circuit-interrupting mechanism without requiring repeated flexure of the connecting wires.

A suitable form for the indicating dial, including the arrangement of the primary and secondary patterns of index numbers and the peripheral slots associated with the numbers, is shown in Fig. 5. This dial is attached to one face of the rotatable member 33 by the intermediation of a mounting ring 42, which is adapted to permit an initial adjustment of the dial with respect to the contactors. When it is desired to change the period during which the respective contactors are to be closed the retractable index member or pointer 22 is lifted and the dial 21 rotated until the desired angular position is reached. Thereupon the index member is dropped into the alined slot to fix the position of the movable parts while readings are being taken on the meter 15 (Fig. 1). As best shown in Fig. 6, the index member 22 is pivotally mounted adjacent one end thereof and is provided with a spring and toggle connection 41 adapted to lock it in either an operative or an inoperative position. While the arrangement shown is considered mechanically preferable, it will be obvious that the relation of the dial and pointer may be reversed, the former being made stationary, while the latter is arranged to rotate with the circuit-interrupting mechanism.

It should also be pointed out that the two displaced contactors above described may be replaced by a single contactor if certain revisions are made in the dial arrangement. For example, in connection with a single contactor a two-scale dial may be employed having principal and subordinate number patterns corresponding to those previously described, but in which the two patterns are displaced from one another by 90 degrees. Alternatively, a single dial of the type which I have illustrated may be used with two quadrangularly displaced index pointers, one of which is employed in determining the unbalance location and the other in distributing the corrective weights.

Although I have described my invention as being particularly applicable to the balancing of multi-bladed fans, it should be understood that it is equally useful in connection with the balancing of other rotatable bodies having any number of circumferentially spaced centers at which it is desirable or necessary to apply balancing weights. It will further be understood that I do not wish to be limited to the particular embodiment which I have chosen as illustrating my invention since many modifications in the structure may be made, and I contemplate by the appended claims to cover all such modifications as fall within the true spirit and scope of my invention.

What I claim as new and desire to secure by Letters Patent of the United States is:

1. Apparatus for analyzing the unbalance of a rotary body into components respectively associated with a plurality of circumferentially spaced balancing centers, said apparatus comprising means for generating by the action of the total unbalance of the body an electromotive force which is in proportion to the magnitude of the unbalance and the phase of which is dependent upon the location of the unbalance, means to integrate said electromotive force, means for selectively determining the limits of integration such that the effect thereon of forces associated with all but one of the balancing centers will be eliminated, and means for measuring the resultant integrated electromotive force, thereby to determine the separate unbalance effect of the forces associated with the said one of said centers.

2. Apparatus for determining the unbalance of a fan having a plurality of circumferentially spaced blades, comprising a motor for driving said fan at constant speed, a coil and a magnet mounted to generate a voltage which is in proportion to the amplitude of vibration of the fan and the phase relation of which is dependent upon the location of its unbalance, means including a circuit-interrupting device in series with the coil for integrating said voltage, a device operable to adjust the period of operation of the circuit interrupter for defining the limits of said integration, means for selectively determining said limits in such a way that said integration becomes independent of the unbalance effect of one of said fan blades and a meter in series with said circuit-interrupting device and said coil for measuring the integrated voltage thereby to determine the separate unbalance effect of another of said fan blades.

3. In apparatus for analyzing the unbalance of a rotating body having a plurality of circumferentially spaced balance centers, a source of electrical current having characteristics determined by said unbalance, means dependent on the cyclical interruption of said current for analyzing the characteristics of the current, a current interrupting device in circuit with said source, said means including a portion rotatable in synchronism with said body and a portion independently rotatable to determine the period of current interruption, an indicating means including a stationary member and a member movable with said independently rotatable portion, and a pattern of index marks on one of said members defining by reference to the other of said members positions of said independently rotatable portion effective to selectively eliminate in said characteristic analyzing means unbalance effects associated with each of said balancing centers.

4. In apparatus for analyzing the unbalance of a rotating body having a plurality of circumferentially spaced balancing centers, a source of electrical current having characteristics determined by said unbalance, means dependent on the cyclical interruption of said current for analyzing the characteristics of the current, a cyclically operable current-interrupting device in circuit with said source and said means including a portion rotatable in synchronism with said body and a portion independently rotatable to determine the period of current-interruption, a dial movable with said independently rotatable portion, a stationary pointer associated with said dial, and a pattern of index marks on said dial defining by reference to said pointer positions of said independently rotatable portion effective to selectively eliminate in said characteristic analyzing means unbalance effects associated with each of said balancing centers.

5. In apparatus for analyzing the unbalance of a rotating body having a plurality of circumferentially spaced balancing centers, a source of current having characteristics determined by said unbalance, means dependent on the cyclical interruption of said current during determinable intervals for analyzing the characteristics of the current and a current-interrupting device in circuit with said source and said means, said device comprising a cam rotatable in synchronism with said body, a pair of electrically separate angularly spaced contactors independently actuated by said cam, means for alternatively connecting said contactors in the current-interrupting circuit, a rotatable support for said contactors including a dial attached thereto, a stationary pointer associated with said dial, a primary pattern of index marks on said dial for indicating by reference to said pointer positions of one of said contactors determinative of the location of unbalance of said body, and a secondary pattern of index marks on said dial defining by reference to said pointer positions of the other of said contactors effective to selectively eliminate in said characteristic analyzing means unbalance effects associated with each of said balancing centers.

6. Apparatus for analyzing the unbalance of a rotating body having a plurality of circumferentially spaced balancing centers, comprising a motor for rotating said body, said motor being so mounted that it is free to oscillate in at least one plane under the influence of unbalanced forces in said body, a generator responsive to oscillations of said motor in said plane for generating an electrical current having characteristics determined by the unbalance of said body, means dependent on the cyclical interruption of said current at determinable intervals for analyzing the characteristics of the current, a current-interrupting device in circuit with said generator and said last-named means comprising a portion rotatable in synchronism with said motor and a portion independently rotatable to determine the period of current-interruption, said device having associated therewith an indicating means including a stationary member and a member movable with said independently rotatable portion of said device, there being a pattern of index marks on one of said members defining by reference to the other of said members positions of said independently rotatable portion effective to selectively eliminate in said characteristic analyzing means unbalance effects associated with each of said balancing centers.

7. In balancing apparatus a stationary mounting structure, a movable member rotatably supported on said mounting structure, an intermittently operable circuit-interrupting device, means connecting said device to said movable member for rotation therewith, the period of circuit interruption of said device being dependent on its angular position, and a scale means including a dial and an index member, one of which is rotatable with said movable member, said dial being provided with angularly spaced peripheral notches therein and said index member being adapted to fit into any one of said notches thereby to fix the angular position of said circuit-interrupting device.

8. In balancing apparatus, a stationary mounting structure providing a bearing surface, a movable member rotatably supported on said bearing surface, a circuit-interrupting device operatively connected with said movable element and rotatable therewith, the period of circuit interruption of said device being dependent on its angular position, a dial rotatable with said movable element for indicating the position of said circuit-interrupting element, said dial having a plurality of peripherally spaced locking means thereon and a retractable index member adapted to cooperate with any one of said locking means thereby to fix the angular position of said device.

9. The method of analyzing the unbalance of a rotatable body into component forces associated with each of a plurality of selected circumferentially spaced balancing centers, which method includes supporting the body to permit substantial transaxial vibration thereof, rotating the body at a desired speed, generating by the action of its transaxial vibrations an alternating electromotive force the magnitude of which is determined by the total unbalance of the body and the phase of which is determined by the location of such unbalance, integrating said electromotive force over a limited period, determining the limits of the period such that the effects on said integration of unbalance forces associated with all but one of the balancing centers are eliminated and measuring the magnitude of the resultant integrated electromotive force thereby to determine the magnitude of the unbalance forces associated with said one of said balancing centers.

10. The method of analyzing the unbalance of a fan into component forces associated with each of a pair of adjacent fan blades, which method includes rotating the fan to produce substantial transaxial vibrations thereof as a result of its unbalance, generating by the action of such vibrations an alternating electromotive force the magnitude of which is determined by the total unbalance of the fan and the phase of which is determined by the apparent location of such unbalance, integrating said electromotive force over a limited period, setting the limits of the period such that the effect on said integration of unbalance forces associated with one of said pair of fan blades is eliminated, and measuring the magnitude of the resultant integrated electromotive force thereby to determine the magnitude of the unbalance forces associated with the other of the pairs of fan blades.

11. The method of analyzing the unbalance of a rotatable body into component forces associated with each of a plurality of circumferentially spaced balancing centers, which method includes rotating the body to produce substantial vibration thereof as a result of its unbalance, generating by the action of such vibration an observable quantity having characteristics determined by the total unbalance of the body, selectively eliminating from said quantity all components except those attributable to unbalance forces associated with a single one of said balancing centers and observing the resultant characteristics of said quantity thereby to determine the magnitude of the unbalance forces associated with said one of said balancing centers.

ERNEST L. THEARLE.